(12) United States Patent
Robinson

(10) Patent No.: US 7,448,998 B2
(45) Date of Patent: Nov. 11, 2008

(54) SYNTHETICALLY FOCUSED ULTRASONIC DIAGNOSTIC IMAGING SYSTEM FOR TISSUE AND FLOW IMAGING

(75) Inventor: Brent S. Robinson, Kirkland, WA (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 664 days.

(21) Appl. No.: 11/063,413

(22) Filed: Feb. 22, 2005

(65) Prior Publication Data

US 2005/0154304 A1 Jul. 14, 2005

Related U.S. Application Data

(60) Division of application No. 10/679,093, filed on Oct. 3, 2003, now Pat. No. 6,860,854, which is a continuation-in-part of application No. 10/136,880, filed on Apr. 30, 2002, now Pat. No. 6,679,847.

(51) Int. Cl.
*A61B 8/00* (2006.01)

(52) U.S. Cl. ........................ 600/447; 600/437

(58) Field of Classification Search .......... 600/407–480
See application file for complete search history.

(56) References Cited

U.S. PATENT DOCUMENTS

| | | |
|---|---|---|
| 4,325,257 A | 4/1982 | Kino et al. |
| 4,561,019 A | 12/1985 | Lizzi et al. |
| 4,604,697 A | 8/1986 | Luthra et al. |
| 5,278,757 A | 1/1994 | Hoctor et al. |
| 5,349,960 A | 9/1994 | Gondo |
| 5,706,818 A | 1/1998 | Gondo |
| 5,718,229 A | 2/1998 | Pesque et al. |
| 5,865,751 A | 2/1999 | Okuno et al. |
| 5,873,830 A | 2/1999 | Hossack et al. |
| 5,951,479 A | 9/1999 | Holm et al. |
| 6,023,977 A | 2/2000 | Langdon et al. |
| 6,027,447 A | 2/2000 | Li |
| 6,042,547 A | 3/2000 | Wright et al. |
| 6,050,942 A | 4/2000 | Rust et al. |
| 6,056,693 A | 5/2000 | Haider |
| 6,126,599 A | 10/2000 | Jago et al. |
| 6,131,458 A * | 10/2000 | Langdon et al. ............... 73/627 |

(Continued)

FOREIGN PATENT DOCUMENTS

EP 0 535 962 4/1997

(Continued)

*Primary Examiner*—Eric F Winakur
(74) *Attorney, Agent, or Firm*—W. Brinton Yorks, Jr.

(57) ABSTRACT

A synthetic focus ultrasound system is described which is operated in a hybrid fashion. System operation alternates between synthetic focus acquisition and conventional focused beam acquisition. This makes possible, for example, the acquisition and display of harmonic images. Speckle artifacts in the synthetic focused ultrasound images may be reduced by combining signals from different sub-apertures which view the image field from different look directions. In a described embodiment, sets of motion maps are be produced for different sub-apertures of the array transducer, then compounded to reduce speckle. One or more identified regions of interest within a synthetic focused ultrasound image may be processed differently from other regions of the image to highlight or better define particular motional characteristics within the regions of interest, such as turbulent flow or different velocities of flow or motion.

7 Claims, 12 Drawing Sheets

U.S. PATENT DOCUMENTS

| | | | |
|---|---|---|---|
| 6,135,956 | A | 10/2000 | Schmiesing et al. |
| 6,193,663 | B1 * | 2/2001 | Napolitano et al. .......... 600/447 |
| 6,210,328 | B1 | 4/2001 | Robinson et al. |
| 6,213,947 | B1 * | 4/2001 | Phillips ....................... 600/443 |
| 6,223,599 | B1 | 5/2001 | Langdon et al. |
| 6,254,542 | B1 * | 7/2001 | Hamilton et al. ............ 600/447 |
| 6,315,723 | B1 | 11/2001 | Robinsons et al. |
| 6,436,047 | B1 * | 8/2002 | Ramamurthy et al. ....... 600/447 |
| 6,464,638 | B1 * | 10/2002 | Adams et al. ................ 600/443 |
| 6,516,215 | B1 | 2/2003 | Roundhill |
| 6,860,854 | B2 * | 3/2005 | Robinson .................... 600/447 |

FOREIGN PATENT DOCUMENTS

| | | |
|---|---|---|
| EP | 0 582 462 | 3/2000 |
| WO | WO 98/55882 | 12/1998 |

\* cited by examiner

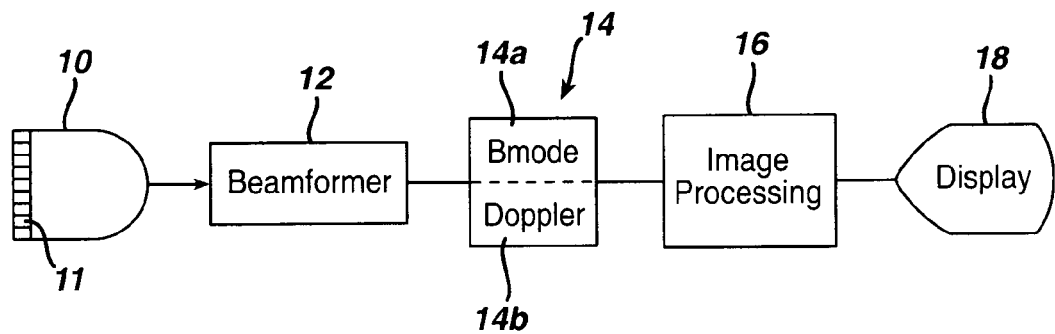
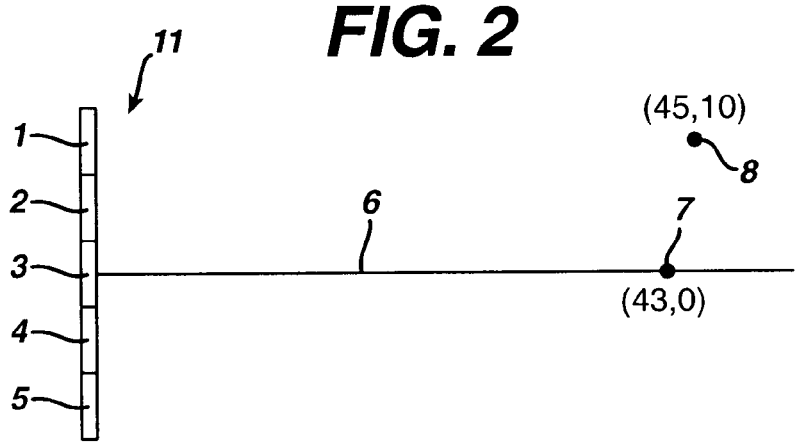
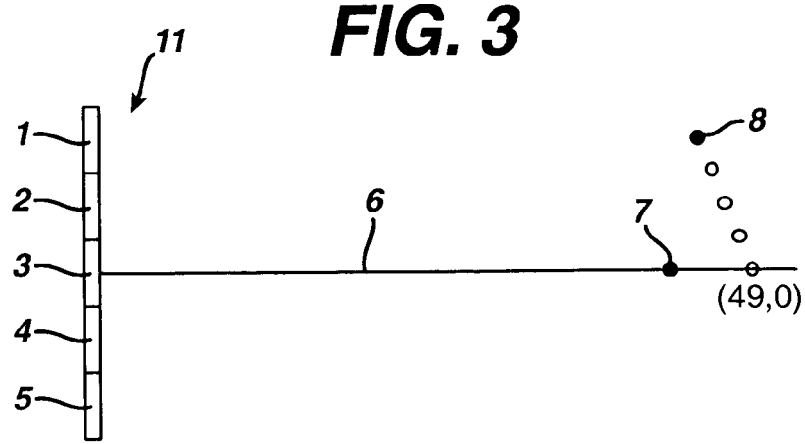

SYNTHETICALLY FOCUSED ULTRASONIC DIAGNOSTIC IMAGING SYSTEM FOR TISSUE AND FLOW IMAGING

This application is a divisional application of U.S. patent application Ser. No. 10/679,093 filed Oct. 3, 2003 and now U.S. Pat. No. 6,860,854, which is a continuation in part of U.S. patent application Ser. No. 10/136,880 of the same title, which was filed on Apr. 30, 2002 and is now U.S. Pat. No. 6,679,847.

This invention relates to ultrasonic diagnostic imaging systems and, in particular, to synthetically focused ultrasonic diagnostic imaging systems which image tissue, flow, and flow spectra.

Today's conventional ultrasound systems produce images by scanning a region of the body with ultrasound beams electronically formed by a transducer array. The timing of signals applied to the array elements determines the direction in which a beam is transmitted and the depth of focus of a beam. A plurality of adjacent beams are transmitted to adequately spatially sample the target region. The echoes from along the beam directions are processed in known ways to form an image of the plane or volume scanned by the beams and depict characteristics of the tissue or bloodflow within the plane or volume.

When a beam is transmitted, the beam profile determined by the transducer element timing can be set to produce the best focus around a selected focal point at a desired depth. A transmitted beam can have only one such focal point; once the beam is launched, the focal characteristic cannot be changed or extended. The clinician will generally set the focus to the depth at which the anatomy of interest may be found. If the clinician wants the optimal focus to be at two or more depths or range of depths, multizone focus must be used, whereby two or more beams are transmitted in the same direction, each focused at a different depth. The entire image plane or volume is scanned by multiple beams in each direction, and the best focused portions of the sets of beams are spliced together to produce a composite image which exhibits the optimal focus at a plurality of depths. However, each differently focused beam set will extend the time required to acquire the image information, which reduces the frame rate of display. Going from one focal zone to two can approximately halve the frame rate, for example.

During reception, optimal focus can be obtained dynamically over the full imaging depth. This is because the receive focus can be dynamically adjusted electronically by continually adjusting delays in the receive beamformer as echoes are received over the full range of depth. The transmitted beams are constrained to a single focal point or region since the transmit focus is accomplished acoustically and not electronically.

A technique for overcoming this transmit focus limitation is known as synthetic focus. Synthetic focus is described in U.S. Pat. No. 4,604,697, for instance. In a synthetic focus system, each transducer element or subset of transducer elements is actuated sequentially. The transmission from each element or group of elements is not focused acoustically but covers the entire image region. The echoes from each transmission are received by all of the elements concurrently and stored. These echoes are then combined in different combinations with different effective delays, thereby forming coherent echoes at points in the image region which are effectively focused at all points. This technique produces image data which is in effect optimally focused on both transmit and receive, providing images which are optimally focused throughout the entire depth of field. In such an approach it is not necessary to first beamform onto distinct A-lines, although this can be done. Rather, the echo data can be directly reconstructed onto image pixels.

While the '697 patent illustrates a synthetic focus technique which is limited to imaging stationary tissues, it is also desirable to extend the technique to flow imaging. U.S. Pat. No. 5,349,960 illustrates one extension of a synthetic focus architecture to Doppler. In this patent a synthetic focus acquisition subsystem is used to produce real and imaginary parts of a complex signal, which is then Doppler processed. The full synthetic focus data set is not used. Rather, reception only occurs on the transmitting element. It is desirable to have a synthetic focus architecture which utilizes more than one receive element and which produces data for all ultrasonic modes, including B mode, colorflow, and spectral flow, without the need for hardware or software dedicated to only a specific mode of operation.

The parent application addresses these desires by providing an ultrasonic diagnostic imaging system in which a one or two dimensional transducer array is operated to acquire synthetic focus ultrasound signals by actuating one or a subset of the elements of the array and receiving echo signals on all of the array elements in response to a transmit event. The received signals are digitized and stored in a memory. Sets of delays are applied to combinations of the stored signals to produce motion maps for a plurality of different velocities. One or more of the motion maps are used to produce B mode, colorflow, spectral, and other ultrasound image modes which cannot be produced by conventional ultrasound systems. The images, either two or three dimensional, are in optimal focus throughout the image plane or volume and can be produced at high frame rates of display. Various transducer element sequencing may be employed to increase the frame rates even higher.

In accordance with the principles of the present invention, the synthetic focused ultrasound system is operated in a hybrid fashion in which operation alternates between synthetic focus acquisition and conventional focused beam acquisition. This makes possible, for example, the acquisition and display of harmonic images for contrast and/or tissue harmonic imaging. Speckle artifacts in the synthetic focused ultrasound images may be reduced by combining signals from different look directions. For instance, sets of motion maps may be produced for different sub-apertures of the array transducer, then compounded to reduce speckle. One or more identified regions of interest within a synthetic focused ultrasound image may be processed differently from other regions of the image to highlight or better define particular motional characteristics within the regions of interest, such as turbulent flow or different velocities of flow or motion.

In the drawings:

FIG. 1 illustrates in block diagram form the major functional components of a typical ultrasound system of the prior art;

FIG. 2 illustrates the presence of two stationary targets in the field of a synthetically focused transducer array;

FIG. 3 illustrates the presence of one stationary and one moving target in the field of a synthetically focused transducer array;

Figure 4:
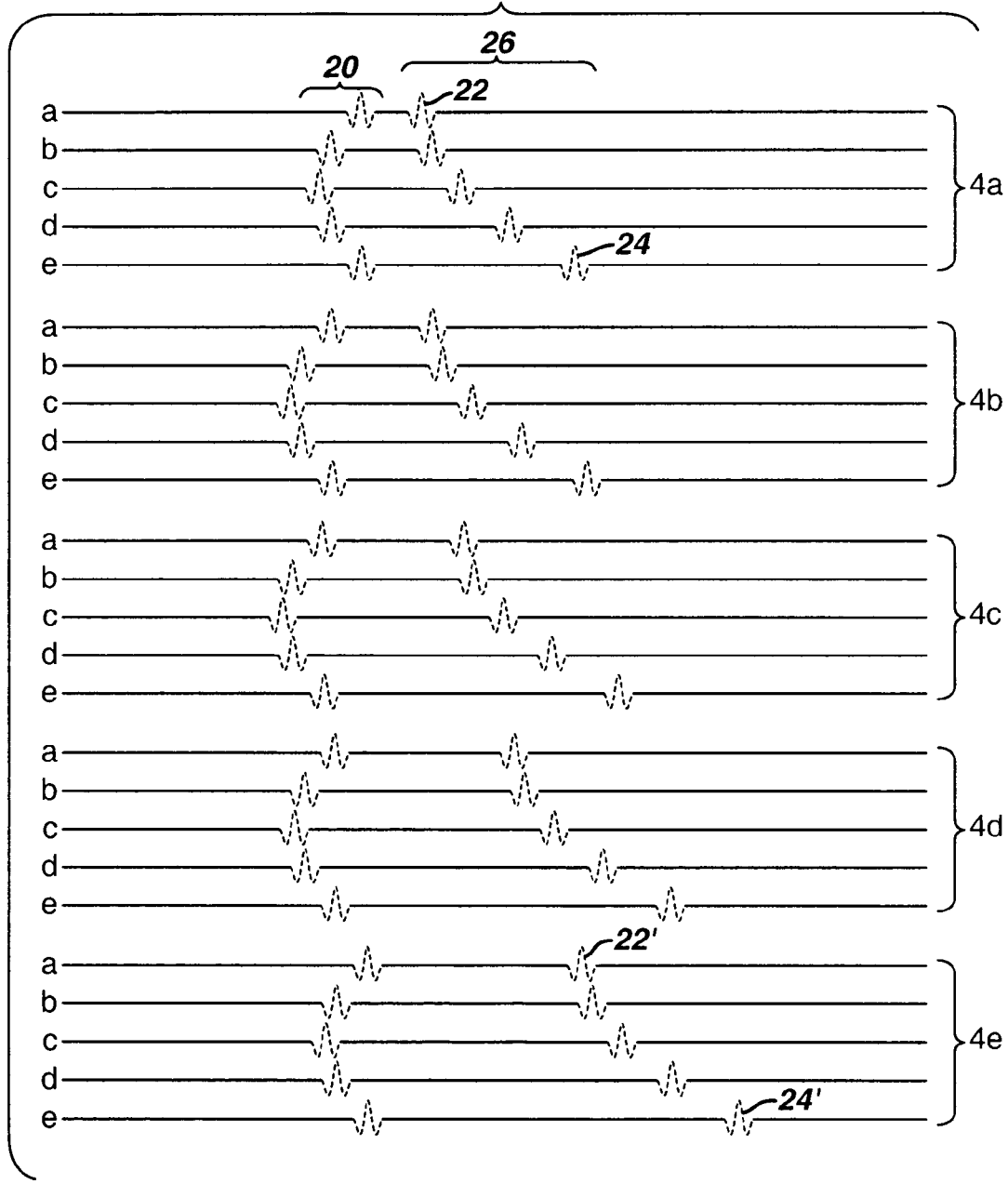
FIGS. 4a-4e illustrate the raw data acquired by scanning the two stationary targets of FIG. 2.

Current diagnostic ultrasound systems may be described as having three distinct operating modes: B-mode echo (i.e., grey-scale), spectral Doppler (i.e., single-gate Doppler with high spectral resolution in only a single sample volume), and color Doppler (i.e., multi-gate Doppler where a single scalar quantity such as mean Doppler frequency, or total Doppler power, is estimated in many sample volumes but with essentially no spectral resolution.) This partitioning is reflected in both the system architecture and system functionality. Typically, specialized hardware is required to implement each mode and only one mode is operational at once. An example of this standard ultrasound system architecture is shown in FIG. 1. A probe 10 has an array transducer 11 which transmits beams along selected lines through the image field under control of a beamformer 12. Echoes from along the lines are formed into lines of coherent echo signals by the beamformer 12. The echoes are applied to a signal processor 14 which has dedicated hardware and software for the various modes of operation. A B mode processor 14a will process the echoes for grey-scale display or a Doppler processor 14b will process the echoes for colorflow or spectral Doppler display. Often separate processors are used for colorflow and spectral Doppler processing. The processed echo information then undergoes image processing 16, and the resultant image is displayed on an image display 18. So-called "simultaneous" operation actually involves rapid temporal multiplexing between different ones of these modes. Such partitioning is necessary in conventional systems in order to optimize performance in each mode while maintaining acceptable frame rates. For example a typical spectral Doppler processor would operate too slowly to process all of the pixels for a real time colorflow display.

However, such partitioning is neither fundamentally necessary nor desirable. Ideally, an ultrasound system would simultaneously estimate the amount of backscattered power in all velocity increments or "bins" at all points in the image, and at frame rates sufficient to track temporal changes. From this general solution for the properties of the target field, conventional operating modes could be derived. For example, standard B-mode images are obtained from the amount of power in the zero velocity bins, color Doppler images may be computed by integrating over non-zero velocity bins to estimate mean velocity or total power, spectral Doppler displays would show the discrete values in all bins, and so on. It is this approach which is taken with the present invention.

FIGS. 2-9 illustrate examples of synthetic focusing, which is utilized to acquire raw echo information for processing in accordance with the principles of the present invention. FIG. 2 illustrates a transducer array 11 which, for ease of illustration, is shown with only five transducer elements 1-5. The center axis 6 of the image field extends from the central element 3. Located in the center of the image field at spatial location (43,0) is a stationary target 7. Located to the left of the center axis 6 as viewed from the array 11 is another stationary target 8 at spatial location (45,10).

A synthetic focus data set is acquired as shown in FIG. 4. Each set of lines of echoes 4a, 4b, 4c, 4d, and 4e illustrates the echoes acquired by all of the transducer elements 1-5 in response to transmission by a single element. The set of lines 4a shows echoes received from targets 7 and 8 in FIG. 2 in response to transmission by element 1. The leftmost echo on each line is the echo from the central target 7. The symmetrical distribution of this group of echoes 20 reveals that the target 7 is in the center of the image field, and its earlier reception in time reveals that it is at a nearer spatial location (with a shorter round-trip echo path) than the target 8. The asymmetrical time distribution of the second (later in time) group of echoes reveals that target 8 is off-axis and at a greater depth than target 7. The earlier occurrence of echo 22 at element 1 than that of echo 24 at element 5 reveals that target 8 is closer to element 1 than element 5. That is, target 8 is on the left side of the image field. This fact is also revealed by the later occurrence of the second group of echoes as successive elements 2-5 are used as the transmit element in echo sets 4b, 4c, 4d, and 4d, as the round-trip distance of each echo path increases as the transmitting element is further removed from target 8 with each successive transmit element 2-5.

Figure 5:
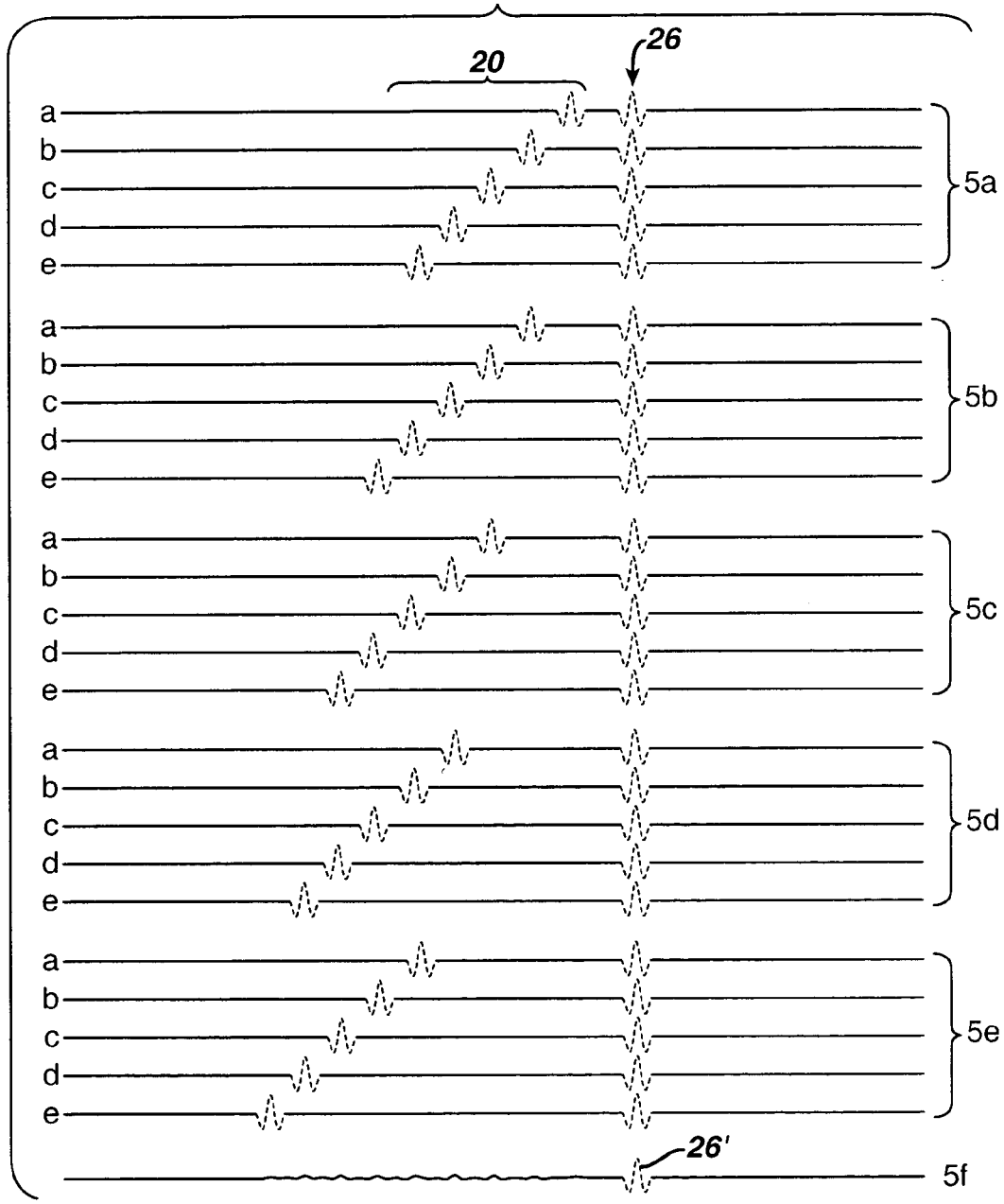
FIGS. 5a-5f illustrate synthetic focus processing of the raw data of FIGS. 4a-4e with delays chosen for the condition of no motion at the location of one of the targets.

The round-trip distance from any transmit element to any receive element for any location in the image field is a priori known. Given that the speed of sound in the medium is known everywhere or, as is commonly the case, can be approximated by a constant, sets of delays can be applied to the raw echo data shown in FIG. 4 to reveal the foregoing characteristics of the targets in the image field. Moreover, the delays can be further applied for different assumptions of motion by the targets. FIG. 5 shows the results when a set of delays are applied for location (45,10) in the image field for the assumption of a static target, that is, it is assumed that target 8 is not moving during the transmit sequence. When these delays are applied to the echo data, it is seen that all of the echoes from the different transmits line up and can be coherently summed, as shown by coherent echo 26' on line 5f. These delays, which are appropriate to align echoes from a static target at location (45,10), are inappropriate for a target at (43,0), and hence the noncoherence of the echoes in group 20 from target 7 is increased. The summation of these echoes will produce only a minor ripple on line 5f as can be seen on line 5f below echo group 20. The amplitudes of the echoes drawn on line 5f are normalized by the number of signals used in the summation (25 in this example.) The waveform of 5f is then detected in a known manner for B-mode echoes to reveal the scattering strength of target 8.

Figure 6:
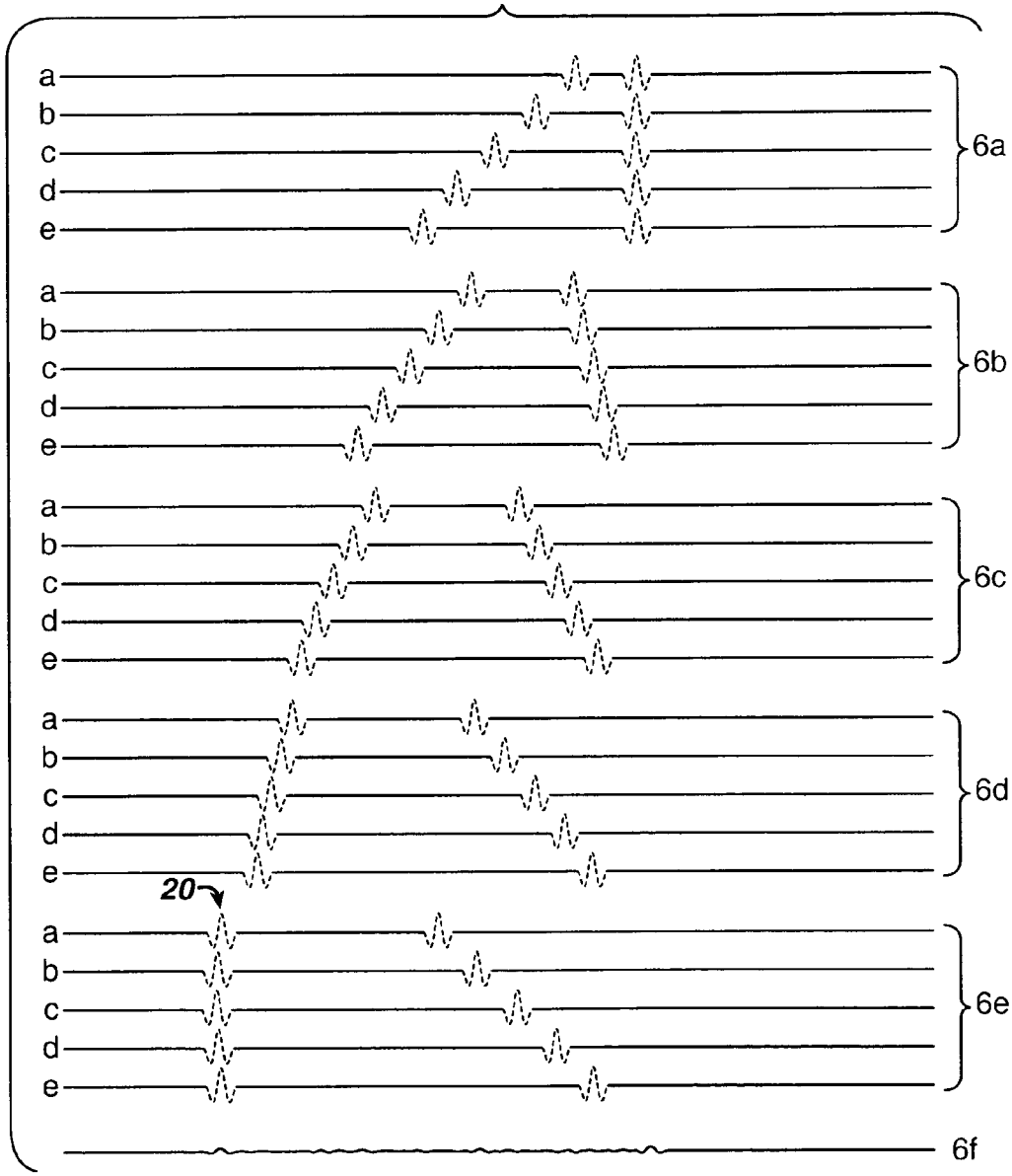
FIGS. 6a-6f illustrate synthetic focus processing of the raw data of FIGS. 4a-4e with delays chosen for the condition of motion at the location of one of the targets.

FIG. 6 illustrates the application of a second delay set to the raw echo data, a delay set which is appropriate for the assumption that, during the transmit sequence, target 8 moves from location (45,10) to location (49,0) as shown in FIG. 3. When each successive element in the array is used as the transmit element, this delay set assumes, the target 8 is at a different location on its way to location (49,0) as indicated by the open circles in FIG. 3. However, target 8 is not moving in this case. The result of this delay set is that coherence will be produced for the set of echo lines 6a, for at this time the target 8 is assumed to be at its starting location (45,10). However, the delay sets for the echo line set 6b, 6c, 6d, and 6e each assume that the target 8 has moved to a location which is incrementally closer to final location (49,0). In fact, the target 8 is static and has not moved. As a result, the second group of echoes in each line set becomes progressively more uncorrelated as FIG. 6 illustrates. It is also seen that the first set of echoes 20 in echo line set 6e are almost in time coincidence, since target 7 is on the central axis and the delay set used for line set 6e assumes that target 8 has moved to an on-axis location but at a slightly greater depth than that of target 7. Since this assumption, that target 8 is moving, is incorrect, the summation line 6f reveals no coherent echoes for the delay set for this assumption.

Figure 7:
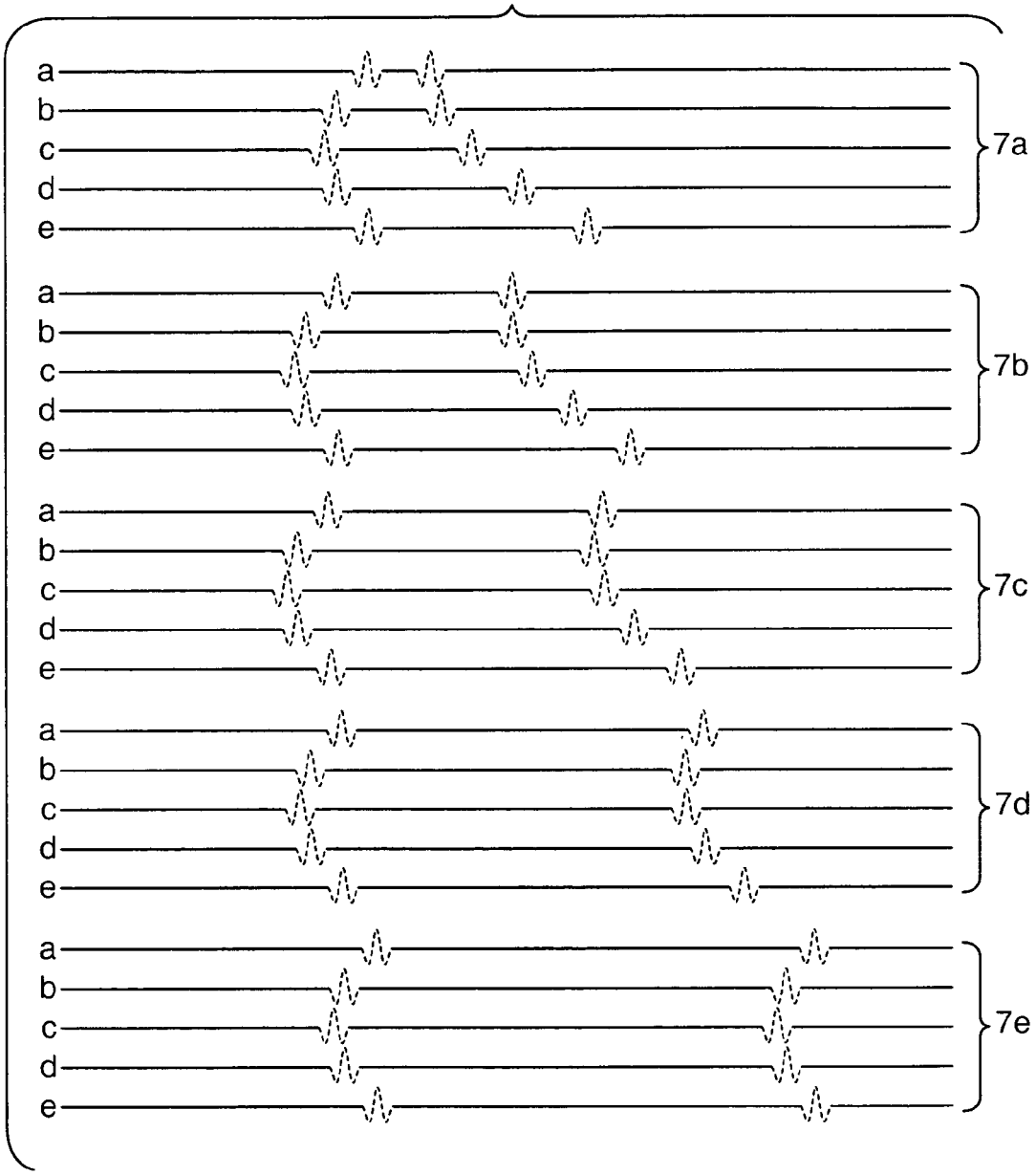
FIGS. 7a-7e illustrate the raw data acquired by scanning the two targets of FIG. 3.

FIG. 7 shows a raw echo data set for the condition where target 7 is stationary and target 8 is moving from location (45,10) to location (49,0) during the transmit sequence interval shown in FIG. 3. As was the case for FIG. 4, echo line set 7a depicts echoes received by all elements 1-5 (a-e) when element 1 is the transmit element; echo line set 7b depicts echoes received by all elements when element 2 is the transmit element; echo line set 7c depicts echoes received by all elements when element 3 is the transmit element; and so forth. At the time of each transmit event the target 8 is at one of the successive circled locations including or between locations (45,10) and (49,0), as shown in FIG. 3.

Figure 8:
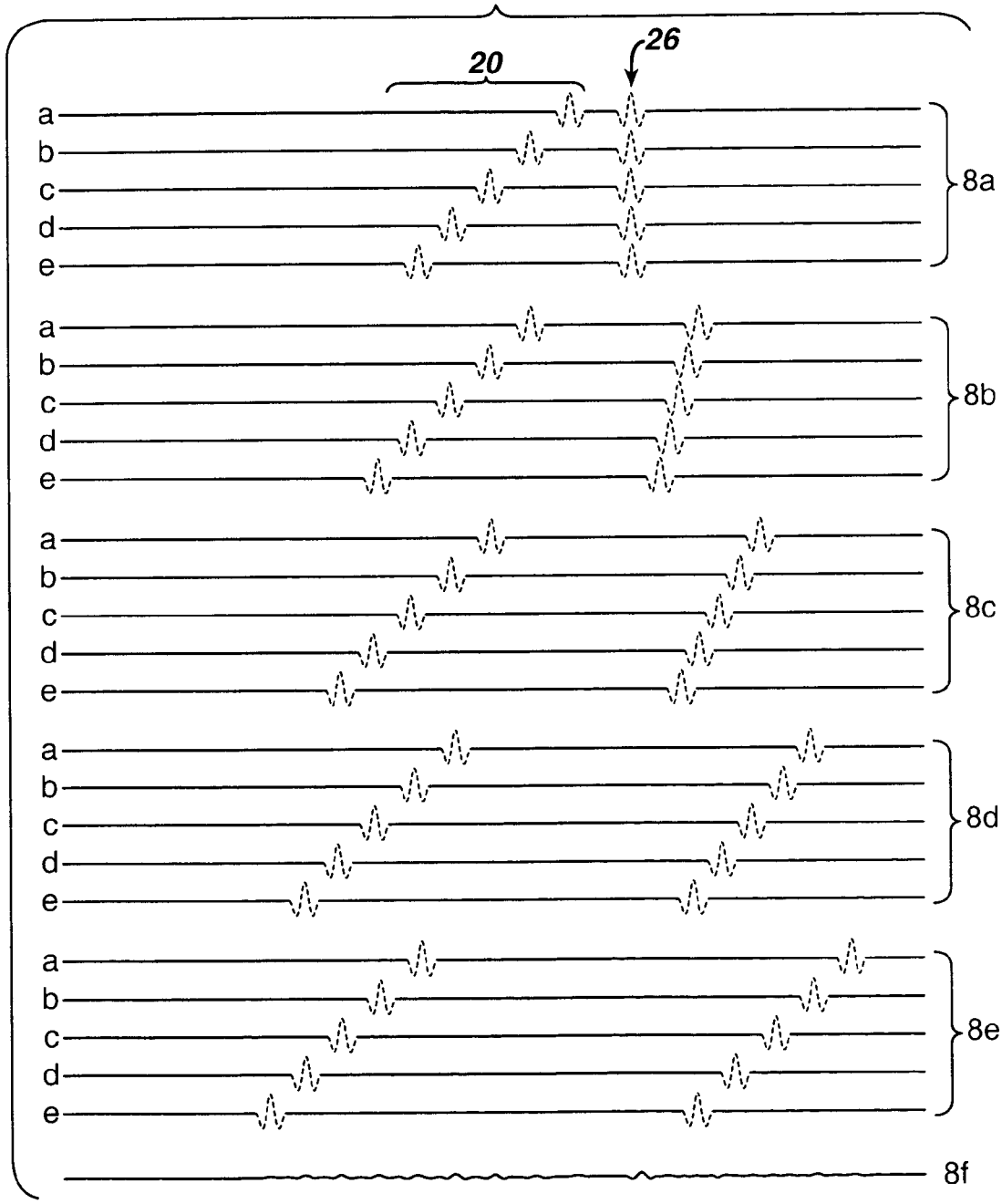
FIGS. 8a-8f illustrate synthetic focus processing of the raw data of FIGS. 7a-7e with delays chosen for the condition of no motion at the location of one of the targets.

FIG. 8 illustrates the results obtained when a delay set is applied to the raw data which is appropriate for a static target at location (45,10), the same delay set that was applied in FIG. 5. The second echoes from target 8 will be in time coherence as shown in echo line set 8a for this delay set, since at this time the target 8 is at the assumed location (45,10). But for successive echo line sets 8b-8e the second group of echoes 26 become increasingly noncoherent, for at each successive transmit time the target 8 is at a greater distance from the assumed location. The echoes from the static target 7 always demonstrate noncoherence, as was the case in FIG. 5. Consequently the summation line 8f shows no coherent echo signals for this delay set and assumption of no motion.

Figure 9:
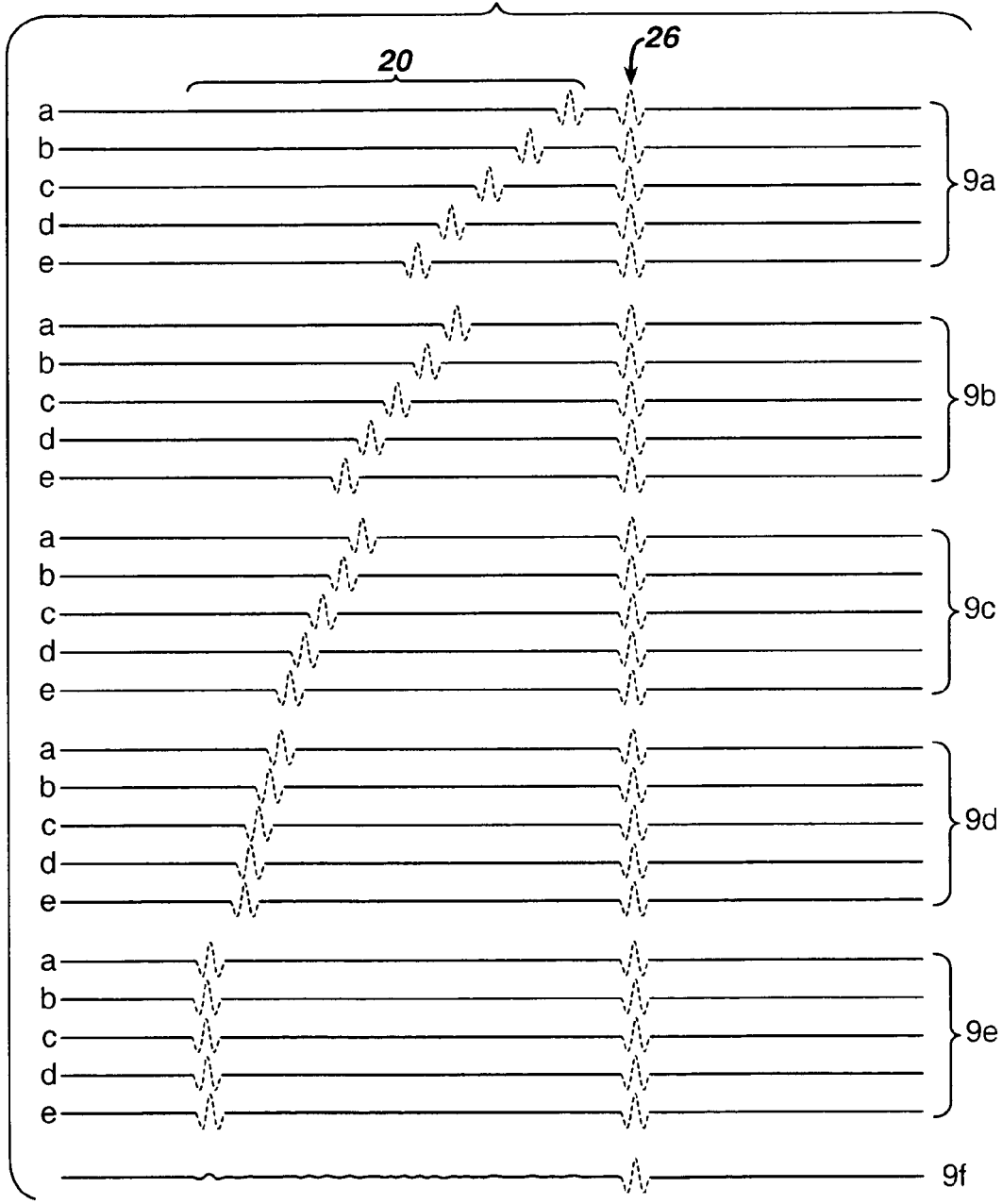
FIGS. 9a-9f illustrate synthetic focus processing of the raw data of FIGS. 7a-7e with delays chosen for the condition of motion at the location of one of the targets.

Finally, FIG. 9 illustrates the result obtained when the delay set chosen is that which matches or tracks the motion of target 8 as it moves from location (45,10) to location (43,0) over the transmit interval of five pulses. For that set of delays all of the second group of echoes 26 from target 8 align coherently as shown in FIG. 9, and by the coherent echo on the summed line 9f. The echoes 20 from target 7 remain noncoherent and do not produce significant signal content on line 9f, except from echo line set 9e where both targets are on the center line 6.

As can be seen from the above, a delay set is effectively the coefficient set for a matched filter which will reveal a characteristic of the image field when objects in the image field have characteristics matching that of the coefficient set. When a target moves in both the direction and at the speed for which the delay set is effective, that motion is revealed. Furthermore, it is seen that a delay set has a unique motional characteristic in both speed (velocity) and direction. Thus, matched filters, each having a characteristic velocity and direction, a vectorial characteristic, can be used to detect motion in the image field with those vectorial characteristics.

In the example shown in FIG. 9, the direction of motion is neither purely axial nor purely lateral. Rather, the velocity has an oblique characteristic.

An ultrasound system acquisition subsystem for acquiring echo line sets as illustrated above is shown in FIG. 10. A transducer array 11 of M elements has M channels 1-M connected to the elements of the array. In the illustrated embodiment each channel includes a transmitter as shown by TX1 in channel 1 for the first element. However, since only one element or subgroup of elements are activated at any one time, one or a few transmitters could be multiplexed to each element when that element is to transmit. The transmit pulse from the transmitter is coupled to the element which is to transmit by way of a transmit/receive switch 32 which protects the receive circuitry from energy from the transmitter. The echo signals received by the element following transmission are coupled by the transmit/receive switch to an amplifier 34 which may be gain controlled to apply time gain compensation to the received echo signals. The echo signals are digitized by an A/D converter and may then optionally be demodulated into in-phase and quadrature signal components by a quadrature bandpass filter (QBP) 38, which may also impose a desired passband on the received signals. The QBP is described in more detail in U.S. Pat. No. 6,050,942.

The echo line sets following transmission by an element of the array are stored in a memory 40. For the case of a one dimensional array used in 2D (planar) imaging, the memory has three dimensions: m, n, and time. In the illustrated embodiment each column has M rows, one for each element that receives echoes following a transmit event. The memory has N columns, one for each of N transmit events. Dimension n can also be thought of as a "slow time" dimension. If each element is used to transmit, N will equal M. However, it is possible to transmit with fewer than all elements, which will provide a reduced signal to noise ratio and, depending on the choice of elements, reduced lateral spatial resolution but a higher frame rate, as the full data set used for image production can be acquired in less time. It is not necessary to actuate the transmit elements in any particular sequence. Elements at separated distances along the array can be actuated in succession, skipping back and forth along the array. Once the predetermined set of echo line sets has been acquired, the data is used for image production as described below.

Consider the case of a conventional Doppler system which uses a 64 element phased array transducer (M=N=64) with a center frequency fo=3 MHz. The velocity resolution is related to the frequency resolution $\Delta f$ according to the Doppler equation:

$$\Delta v = (c \, \Delta f)/(2 \, fo)$$

where $\Delta f$ is determined by the reciprocal of the FFT window length (assuming a rectangular window), i.e.: $1/(L \, \Delta T)$, where L is the number of samples (transmit pulses) in the FFT window, and $\Delta T$ is the period between pulses. A typical value might be $\Delta T = 200 \, \mu Sec$ which produces a pulse repetition frequency (PRF) of 5 kHz. A typical value for L is 64 so that the conventional Doppler system has a velocity resolution of $$c/(2 \, fo \, L \, \Delta T) = 2.0 \, cm/sec.$$

Now consider operation of the same 64 element transducer in a synthetic focus system in which each element is pulsed once. The total observation interval is $N \, \Delta T$. Further assume that the motion is axial. Then, if the difference, $\Delta v$, between the velocity that a matched filter is tracking and the actual target velocity is such that the target moves an additional $\lambda/2$ during the observation interval, then the echoes from the target undergo a full cycle of phase shift and the output of the matched filter will be minimized. Therefore, $\Delta v$ represents the velocity resolution and equals:

$$\Delta v = (\lambda/2)(N\ \Delta T)$$
$$= c/(2\ fo\ N\ \Delta T)$$
$$= 2.0\ cm/Sec.$$

This is the same as for conventional Doppler. Thus there need be no loss in velocity resolution in a synthetic focus approach.

The above discussion considers axial velocity resolution. Lateral velocity resolution will generally not be as great since the rate of change of phase with position is typically less in the lateral plane. Lateral velocity resolution can be increased by using larger transmit and receive apertures. The dynamic transmit focus possible in synthetic focus allows the use of large transmit apertures without depth of focus problems.

Of course, the velocity resolution of the synthetic focus system can be increased merely by extending the observation interval. This can be achieved by increasing $\Delta T$ or, preferably, by pulsing each element multiple times during the observation interval. Although this reduces frame rates, the result is only to reduce a very high frame rate to a fully acceptable frame rate. A conventional B-mode image typically uses on the order of 100 transmits along 100 distinct lines. For the value of $\Delta T$ used in this example, each frame would require 20 mSec (or a frame rate of 50 Hz). In colorflow mode, an additional 30 Doppler lines might be used. Each Doppler line would typically require perhaps 10 transmits increasing the total acquisition time by 60 mSec and reducing the overall frame rate to 12.5 Hz. In contrast, for this example, the frame rate for synthetic focus would be set by N=64 transmits and would be 78.1 Hz regardless of whether the output mode was B-mode or colorflow.

On the other hand, if reduced velocity resolution is acceptable then fewer pulses (and therefore fewer transmit elements) can be used. This results in even higher frame rates, which makes the synthetic focus approach one worth considering for real time 3D imaging.

In an analogous fashion to spectral analysis, apodization functions can be applied across the observation windows in order to attenuate sidelobes in the velocity response. If the acquisition sequence is monotonic with respect to the transmit element position (that is, the sequencing steps across from one side of the transmit aperture to the other), then the apodization function serves double duty—it also attenuates sidelobes of the spatial (beam) response.

Various sources of "spectral broadening" may reduce velocity resolution beyond that predicted by the narrow band analysis above. A major cause of spectral broadening in conventional Doppler is "transit time broadening". With short pulses or narrow beams (large apertures), the targets only remain in the sample volume for a limited period, thus reducing the observation interval. One solution is to lengthen the pulse and/or broaden the beam (reduce the aperture) but this reduces spatial resolution. The present invention avoids this problem since it inherently "tracks" the targets, that is, the sample volume moves with the targets. Therefore, it is possible to achieve both high spatial resolution and greatly reduced spectral broadening.

Remaining sources of spectral broadening include transit time in the elevation dimension (when using one-dimensional arrays) and, to a lesser extent, the secondary effects of changes in the RF point spread function with position. However, since the targets will likely be tracked over relatively small distances, this latter effect is not a major problem.

While "wall filtering" is critical in color Doppler (due to the poor velocity resolution of the short ensemble and because color Doppler measurements are mean velocity estimates), its function in spectral Doppler (which has much better velocity resolution) is largely to reduce down stream dynamic range requirements and allow the use of FFT-based spectral analysis. It is therefore the case that, provided care is taken to control velocity sidelobe response and to have adequate processing dynamic range, wall filters are not fundamentally necessary to implement the present invention. However, if some degree of wall filtering is desired, it may be implemented simply by transmitting from each element more than once. Then, the wall signal can be estimated and subtracted from the return from each individual transmit element before application of the delay sets. The velocity response of this process can be tailored through suitable choice of the intervals between transmit events and filter weights and can be different for different motion maps. For example, no wall filtering would be used when calculating the maps corresponding to static or slowly moving targets.

In an embodiment of the present invention spatial resolution can be at least as good as that of conventional B-mode and Doppler imaging because: 1) Synthetic focus allows dynamic transmit focus; 2) It is not necessary to use narrow bandwidth bursts (poor axial resolution) to reduce spectral broadening; and 3) It is not necessary to use wide beams (poor lateral resolution) to reduce spectral broadening.

Frame rates are determined by the number of transmit pulses. Synthetic focus allows the entire frame (not just one line) to be reconstructed from these pulses. Therefore, very high frame rates can be achieved. This is of particular significance for color flow imaging and, as mentioned above, for 3D imaging from 2D arrays. It is emphasized that it is not necessary to compromise other aspects of system performance (such as field of view or spatial resolution) to achieve high frame rates. Only velocity resolution has a direct effect on frame rates but, as the example above shows, it is possible to achieve much higher frame rates than conventional color flow while at the same time achieving much greater velocity resolution.

Sensitivity is a major issue in Doppler studies since scattering from erythrocytes is weak. Sensitivity is fundamentally limited by the amount of energy that is transmitted and the amount of thermal noise contributed by the transducer elements and receive amplifiers. This places synthetic focus at a disadvantage by approximately the square root of M (in terms of voltage signal to noise ratio) if the voltages applied to the transmit elements are not changed relative to conventional transmit beamforming. However, when it is recalled that synthetic focus transmits are non-focused and have low per-element duty cycles it is apparent that the voltage applied to each transmit element can be significantly increased beyond that used for the element in conventional beamforming transmission before whatever limiting factor (e.g.,: SPTA, max MI, scanhead temperature, saturation, etc.) is reached. Analysis based on peak pressure levels then predicts a square root of M advantage in sensitivity for synthetic focus over conventional beamforming. Coded waveforms, with large time-bandwidth products, may also be employed to increase sensitivity.

Figure 10:
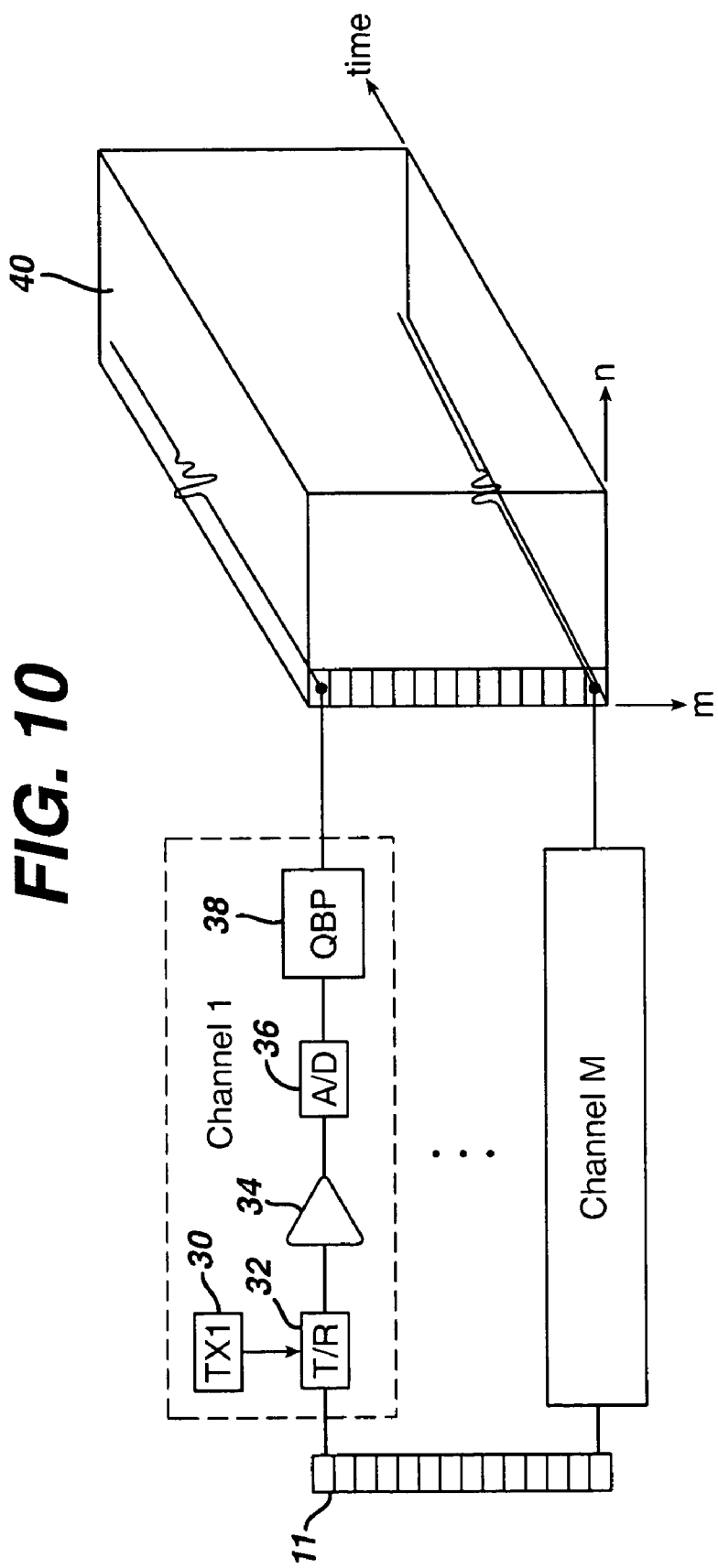
FIG. 10 illustrates in block diagram form a synthetic focus data acquisition system suitable for acquiring the data illustrated in FIG. 4-9.

In the embodiment shown in FIG. 10, the raw echo data from synthetic focus acquisitions as illustrated in FIG. 10 is processed by K delay sets (coefficient sets) to form K motion maps, each for a different motion characteristic. Selected ones of these motion maps are then used individually or in combination to produce all of the standard ultrasound imaging modes, and, in addition, if desired, modes not possible in conventional systems. Mathematically, this process begins with the acquisition of a set of waveforms $f_{n,m}(t)$, where indices n and m identify a particular transmit/receive element pair in the full data set. A set of K images of the form $g_k(\vec{u})$ is constructed, where $\vec{u}$ is a position vector in the ultrasound image $\vec{u}=(x,y)$ for a 2D image and $\vec{u}=(x,y,z)$ for a 3D image) and k specifies the $k^{th}$ motional characteristic. The K images are processed using a motion analyzer which extracts the type of motion and/or image format which is to be displayed. An individual image is then displayed, or a number of images are shown simultaneously for a compound display format such as colorflow. An entirely new set of waveforms may be acquired to produce the next image in the real time sequence, or a partial set acquired and processed with previously acquired waveforms to produce images at an increased frame rate but with some degree of temporal persistence from frame to frame. In the latter embodiment, the motion maps 60 of FIG. 11 must be stored in undetected format. However, memory 40 can be reduced in size or even eliminated.

The images in this process may be expressed as:

$$g_k(\vec{u}) = \sum_{n=1}^{N} \sum_{m=1}^{M} W_{n,m} f_{n,m}(T_{n,m,k}(\vec{u}))$$

where $W_{n,m}$ is an apodization weighting function and $T_{n,m,k}$ is a delay weight which is a function of motion and, for a constant velocity, may be expressed as $$T_{n,m,k} = \frac{|\vec{A}_{T,n} - \vec{u} - (n-1)PRI\vec{v}_k| + |\vec{A}_{R,m} - \vec{u} - (n-1)PRI\vec{v}_k|}{c}$$

$\vec{A}_{T,n}$ is the location of the transmit element for the $n^{th}$ transmit event and $\vec{A}_{R,m}$ is the location of the $m^{th}$ receive element. PRI is the pulse repetition interval and the velocity of the motion map is $\vec{v}_k$. If the velocity is not constant but accelerative, then the linear position term $(n-1)PRI\vec{v}_k$ must be replaced by a more general function $\vec{a}(n,k)$ to describe the motion.

One problem with the simple expression for the $T_{n,m,k}$ delay weight presented above is that the targets move slightly between the time that the $n^{th}$ transmit event occurs and the time that the target actually intercepts and scatters the energy from that transmit. This results in a slight focusing error (because the net displacement of the target from its assumed position is different for different transmit and receive element pairs). The error becomes more significant with increasing target velocities. A more precise calculation of the delays would take this effect into account.

Figure 11:
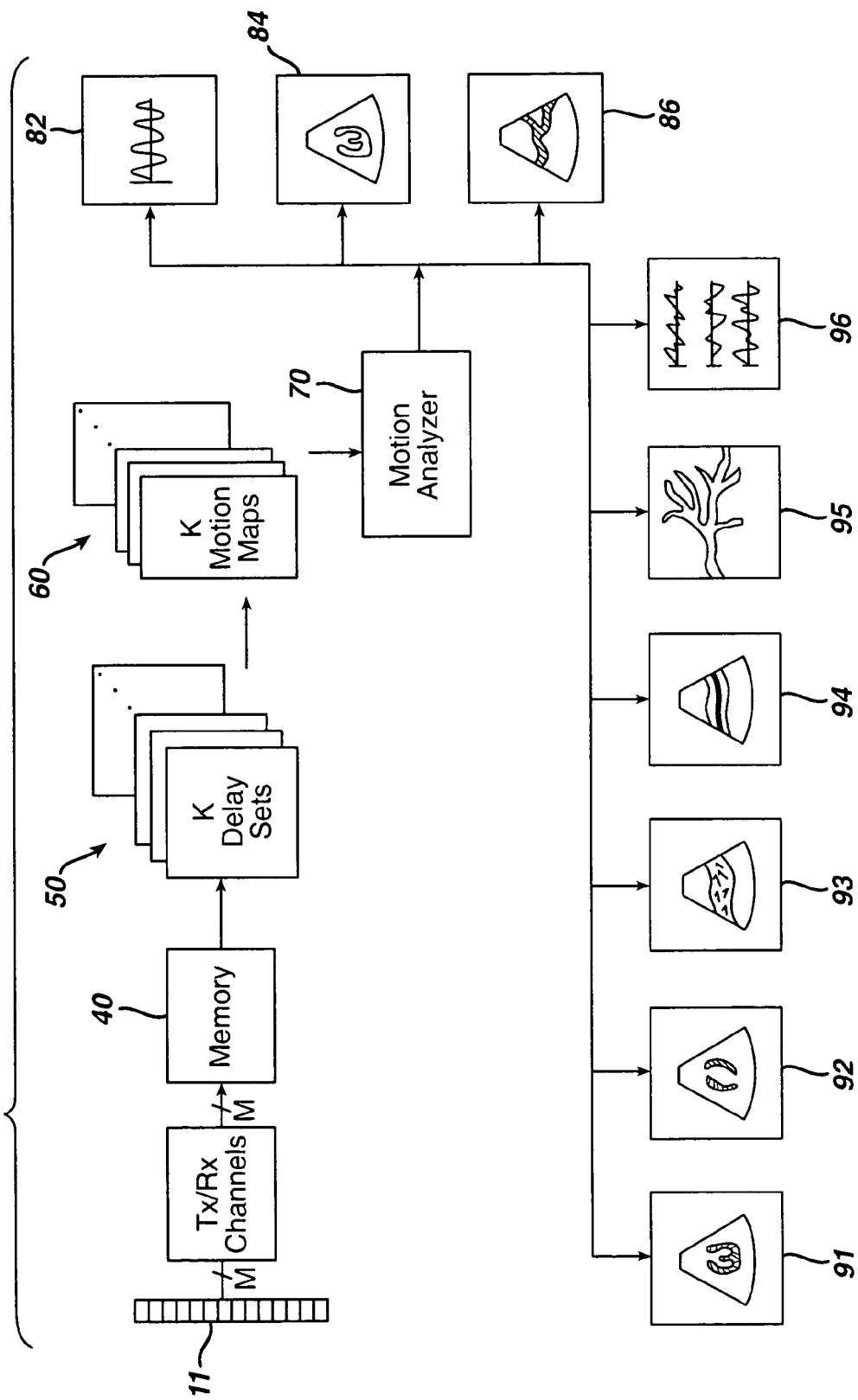
FIG. 11 illustrates an ultrasound system constructed in accordance with the principles of the present invention.

A functional block diagram of an ultrasound system constructed in accordance with the principles of the present invention is shown in FIG. 11. The elements of a transducer array, which may be a 1D array or a 2D array, are coupled to M transmit/receive channels (see FIG. 10) which cause individual ones of the elements to transmit for reception by a selected group of receive elements. Typically, all of the array elements will receive echoes in response to each transmit event. The transmit/receive channels are coupled to the memory 40 where the sets of echo waveforms are stored as described above. The stored echo information is operated upon by K delay or coefficient sets 50 and detected in the conventional manner to produce K motion maps 60, each for a different velocity vector. A motion analyzer 70 then selects various ones of the motion maps to produce the desired mode or modes of ultrasound display. For instance, the motion map for $\vec{v}_k=0$ can be used to produce a grey-scale (B-mode) image 84. However, when motion is present, contrast will be reduced identically to conventional synthetic focus imaging. It is preferred that the B-mode image 84 be constructed from either the peak pixel values over all motion maps or, preferably, the integration of the magnitude or power in each pixel over all motion maps in order to avoid reduction in contrast due to motion. A B-mode tissue image is then overlaid with a colorized motion image made by appropriately integrating the non-zero velocity images above a certain velocity determined by the desired wall filter cut-off to compute mean velocity (normalized first moment), the result being a colorflow image 86. The velocity data at any pixel or group of pixels can be plotted graphically to produce a spectral flow display 82, or a group of such displays 96 at selected points in the image. An embodiment of the present invention can produce the equivalent of a multigate spectral Doppler display at any or all points in the image from a single acquisition sequence. The velocity values can be accumulated from the non-zero motion maps to produce a total power display 95, the equivalent of a power Doppler image. By spatially displaying velocity information of tissue using a wall filter setting which passes low velocities (with the possible exception of zero velocity), a tissue motion image 92 can be produced. A power motion image 91 (see U.S. Pat. No. 5,718,229 entitled "MEDICAL ULTRASONIC POWER MOTION IMAGING") can be produced from static motion maps from successive acquisitions. Since the motion vector at every pixel is present in the motion images, a vector flow image 93 can be produced. An image 94 showing the flow velocity with the greatest power can be produced if desired. Other display formats will readily occur to those skilled in the art.

In a constructed embodiment the system resolution will be determined by the number of velocity bins (for discrete motion maps) at each pixel in a given direction and the number of directions for which velocity bins are produced. For example in the axial direction there may be ±64 bins for velocities both toward and away from the transducer, for a total of 128 bins. In the lateral direction where resolution is inherently poorer there may be only ±16 or 32 bins. The number of directions for which velocities are estimated between these orthogonal directions is also a variable to be chosen, and can be four, eight, or sixteen directions, depending upon the desired directional resolution. In a two-dimensional imaging system in which the vector velocity is solved at every point in the image, 32,000 or more bins per pixel may be needed. A three dimensional system will increase this to millions of bins.

Figure 12:
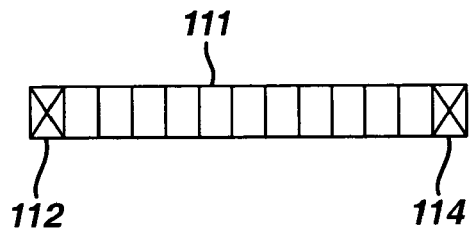
FIG. 12 illustrates the operation of a linear array transducer to acquire synthetic focus ultrasound data.

As mentioned above, the acquisition rate can be increased by transmitting with less than all of the elements. For instance, FIG. 12 illustrates a 1D array 111 in which only the end elements 112 and 114 are used for transmission. For each transmit event, all of the elements of the array are preferably used for reception, although fewer may be employed. Additional elements in the center of the array may be used for transmission as desired, or any other sparse array combination.

The acquisition sequence embodied by FIG. 12 can have the same high spatial resolution as a sequence which uses all elements to transmit. However, when different targets have different velocities there may be undesirable cross-talk, or ambiguity, between the spatial response and the velocity response. In other words, the ability of the system to distinguish between a first target or group of targets at a first position moving at a first velocity and a second target or group of targets at a second position moving at a second velocity is diminished.

This ambiguity can be controlled by the choice of which transmit and receive elements are used and in which order. For example, the ambiguity can be minimized by using an acquisition sequence of the type illustrated in FIG. 13. Here an inner pair of elements 102 and 104 are used to sequentially transmit. Element group 106 is used to receive when the transmit is from 102 and element group 108 is used to receive when the transmit is from 104. This sequence has the property that the mid-points between transmit element 102 and all the elements in receive aperture 106 are co-located with all the mid-points between transmit element 104 and all the elements in receive aperture 108. Other sequences that preserve the commonality of the transmit/receive mid-points are also possible. For example, the separation between the pair of transmit elements can be increased (or reduced) while the number of elements in the receive aperture is reduced (or increased) appropriately.

Figure 13:
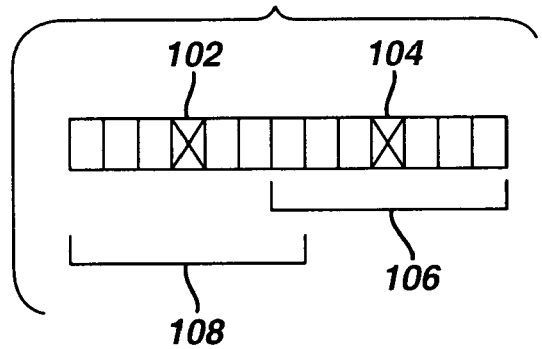
FIG. 13 illustrates a second technique for operating a linear array transducer to acquire synthetic focus ultrasound data.

Sequences of the type illustrated in FIG. 13 reduce the ambiguity between range and velocity at the expense of reducing spatial resolution whereas the sequence in FIG. 12 maximizes spatial resolution at the expense of increased ambiguity. Other tradeoffs, where there is an intermediate degree of mid-point commonality, are also possible. For example, the transmit element pair separation of FIG. 13 could be used with the full receive apertures of FIG. 12. Or, the transmit sequence can use more than two elements.

In general, provided that the received data is preserved in memory, the present invention allows such a tradeoff to be made after data acquisition has occurred. The tradeoff can be very flexible. For example, different motion maps can be constructed using different numbers and locations of transmit and receive elements. It is generally preferred to use more elements, and hence higher spatial resolutions for low velocities. For higher velocities such as those encountered when imaging relatively weak scatterers such as blood, it is generally desirable to reduce cross-talk from slower moving but stronger scattering targets such as tissue. Here it is preferred to trade off some spatial resolution for reduced cross-talk by using a sequence which increases commonality of the mid-points. Such tradeoffs can be made adaptively, based on analysis of the spatial and velocity characteristics of the particular target situation. In addition, the results from multiple, different, acquisition sequences for a given velocity can be detected then combined non-linearly. Such combinations can also be adaptive.

Figure 14:
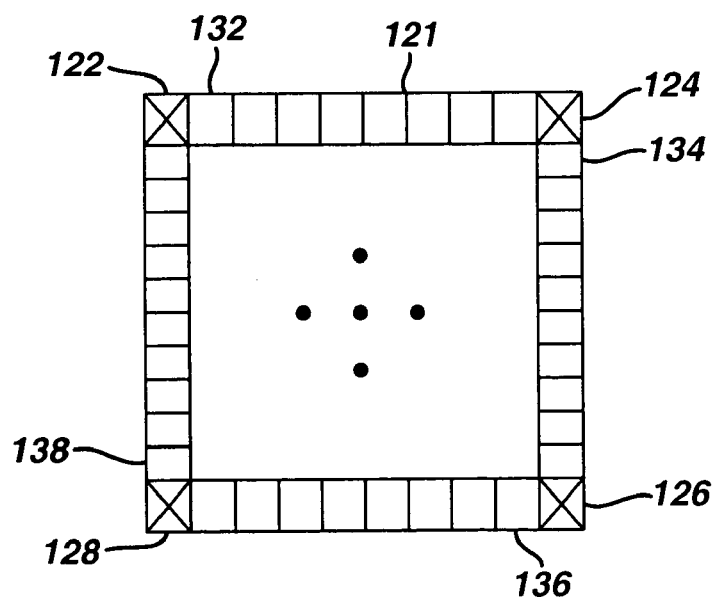
FIG. 14 illustrates the operation of a two dimensional array transducer to acquire synthetic focus ultrasound data for a high frame rate of display with reduced temporal artifacts.

FIG. 14 illustrates a 2D array for three dimensional imaging. Only the elements around the periphery of the array are shown in detail; the elements internal to the periphery of the 2D array are represented by the crossed dots in the center of the drawing. Transmission from this 2D array 121 for synthetic focus imaging may proceed by transmitting from ones of the peripheral elements in succession and receiving by all of the array elements following each transmit event. For instance, corner element 122 may be activated first, followed by transmission from the other corner elements 124, 126, and 128 in succession. These four transmissions provide sufficient data to create motion maps with full spatial resolution. However, all receive elements, which typically number in the thousands, must be used. Alternatively, if the progression of transmit elements then proceeds around the periphery by actuating elements 132, 134, 136, and 138 next, and so on until each of the peripheral elements has produced a transmit event, then reception need only occur on the elements on the periphery of the array to create full spatial resolution motion maps. The sequence is then repeated for the next full echo data set. The frame rate may be the inverse of the time required to acquire a full data set from transmission by all of the peripheral elements, or may be increased by updating the image when part of a new sequence has been acquired.

Since the synthetic focus echo information is buffered, that is, it is stored in memory, the same data that is used to derive motion information and images may also be used to estimate and correct for tissue aberrations. Techniques for estimating and correcting for aberrations through beamformer delay control are described in U.S. Pat. Nos. 6,023,977, 6,131,458, 6,027,447 and 6,223,599 for example. However, in all of these embodiments estimates for aberration correction are produced from a current data set, then used during the reception of subsequent data sets. In a synthetic focus system of the present invention, since the transmit beamforming is done electronically rather than acoustically, transmit corrections may be applied to the same data set used to estimate the corrections. This avoids the need for real-time estimation and re-transmission and also can provide more accurate aberration correction.

Figure 15:
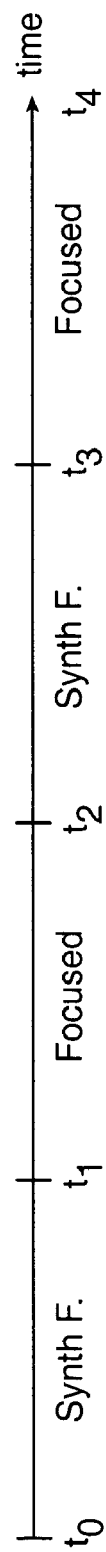
FIG. 15 illustrates the time interleaving of synthetic focus data acquisition and conventional focused beam data acquisition in a hybrid embodiment of the present invention.

FIG. 15 illustrates an embodiment of the present invention in which hybrid acquisition is employed. That is, the ultrasound system alternates between acquiring synthetic focus echo data and standard focused beam echo acquisition. Such a system makes possible the production of harmonic images (tissue or contrast) in a synthetic focus setting. There are two limitations to harmonic imaging in a conventional synthetic focus system. First, the intensity of harmonic signals, particularly tissue harmonic signals, is very low relative to fundamental frequency signals. This is because harmonic generation is proportional to the square of the acoustic pressure at the target. Since synthetic focus generally only uses a few elements of a transducer array for each transmission, and may only use a single element, the pressure of the acoustic energy field thus developed is far below that which is present at the focus of a standard focused transmit beam, and may be insufficient to produce diagnostically useful harmonic images. Furthermore, the combining of echo signals employed in the production of a synthetic focus image is generally done linearly and is predicated on assumed linearity in the acoustic field. While this assumption is true for fundamental signals it is not the case for nonlinear higher harmonics.

Hybrid acquisition as shown in FIG. 15 addresses these problems and enables harmonic imaging in the context of synthetic focus imaging. In this embodiment synthetic focus signal acquisition is performed during a first time interval from $t_0$ to $t_1$. These signals may be acquired and buffered until all the data needed for synthetic focus motion imaging has been acquired. The synthetic focus data from the transducer elements is then combined to form a motion or flow map such as described above. This can be the flow image component of a color flow image, for example. During a subsequent time interval from $t_1$ to $t_2$ conventional focused beams are transmitted and the echoes acquired at a harmonic frequency. This harmonic echo data may be used to produce the tissue harmonic image component of a color flow image. The flow and tissue components are overlaid or displayed together as a colorflow image in which the tissue is imaged harmonically. In the third interval from $t_2$ to $t_3$ the system performs synthetic focus signal acquisition again, followed by focused beam transmission and acquisition during the fourth interval from $t_3$ to $t_4$. The third and fourth intervals may comprise the acquisition time for a second color flow image frame, or a number of time interleaved intervals greater than two may be alternated to acquire both synthetic focus and focused beam signals for a display image. A hybrid embodiment such as this may, under certain conditions, be faster than a conventional imaging system; can do motion tracking as described above; and enables images to be reprocessed from buffered data for different sets of parameters such as beamforming characteristics, wall filtering, or thresholding.

A synthetic focus motion imaging system may also be used to produce quantified data. Quantification may be applied to the synthetic transmit aperture images. In particular, parameters that are not routinely available, such as motion direction (vector), linear and angular accelerations can be computed from synthetic focus data.

Figure 16:
FIG. 16 illustrates the use of sub-apertures to acquire synthetic focused data sets for speckle reduction by spatial compounding.

In a synthetic focus system it is not necessary to process all of the data from the entire aperture coherently. For example, coherent processing may be performed on multiple sub-apertures and the results combined incoherently to reduce speckle through spatial compounding. With buffered synthetic focus data sets, this processing can be applied and the degree of coherence adjusted for processing or reprocessing of the same acquired data set. In the embodiment of FIG. 16, the full aperture of a transducer array 11 is divided into three sub-apertures identified as sub-aperture 1, sub-aperture 2, and sub-aperture 3. The signals received by each sub-aperture are synthetically focused as described above to produce a set of one or more motion image maps for each sub-aperture. The corresponding motion image maps from the different sub-apertures are then compounded together to reduce speckle by virtue of the different look directions of each sub-aperture. If desired, an image map produced from the full aperture 11 can be compared or blended with the compounded image map set of the sub-apertures to produce additional diagnostically useful image data. Further aspects of spatial compounding may be found in U.S. Pat. Nos. 6,210,328, 6,126,599, and 6,135,956.

It is not necessary to process the entire frequency spectrum coherently, either. If coherent (pre-detection) processing is performed on multiple sub-bands of the received synthetic focus echo signals and the results combined incoherently, speckle can be reduced by frequency compounding. As in the previous embodiment, with buffered synthetic focus data sets this processing can be applied and the degree of coherence adjusted for processing or reprocessing of the same acquired data set. Further aspects of frequency compounding are described in U.S. Pat. No. 4,561,019.

Figure 17:
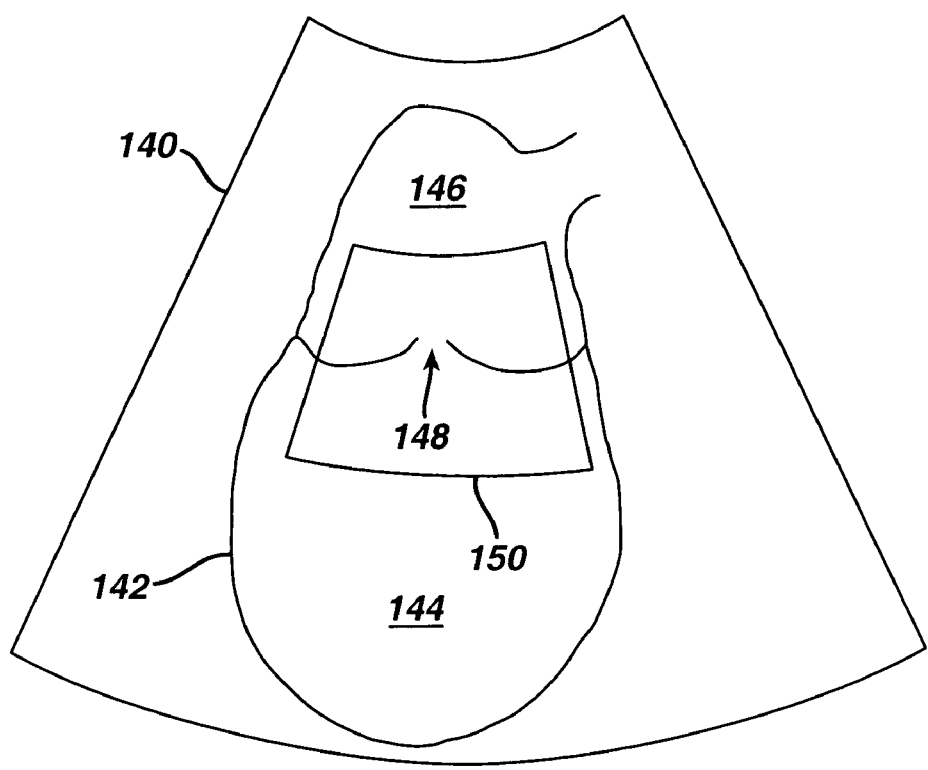
FIG. 17 illustrates a synthetic focus ultrasound image in which different processing is performed for synthetic focus data that is applicable to a region of interest in the image.

In a synthetic focus motion imaging system, different regions of the image, termed regions of interest or ROIs, can be processed differently according to analysis of local characteristics. The variability can be controlled by a user interface which allows the user to position and size a ROI box. FIG. 17 illustrates an embodiment of the present invention in which the synthetic focus data pertinent to a ROI is processed differently from data pertinent to the surrounding image field. FIG. 17 shows a synthetic focus ultrasound image 140 displaying an image of the heart 142. The heart has an upper chamber 146 and a lower chamber 144 connected by a heart valve 148. Because the blood flow in the vicinity of the heart valve 148 may be uniquely different from that of the heart chambers, an ROI box 150 is positioned around the heart valve 148. For instance the blood flow around the valve may be more turbulent than the more laminar flow of the surrounding chambers and blood vessels. The blood flow in the vicinity of the valve 148 may exhibit different velocities than the surrounding blood flow. Accordingly, the synthetically focused data pertinent to the ROI box 150 is differently processed in consideration of these characteristics. The data from a different number of transducer elements may be used to synthetically focus the motional characteristics within the ROI box, or different spatial resolution may be employed. If the velocities within the ROI box are anticipated to be higher than the surrounding velocities, lower resolution may be employed within the ROI box to follow or track the heart valve blood flow more accurately. The buffered synthetic focus data pertinent to the ROI box may be reprocessed to reveal particular characteristics such as different linear velocities and/or acceleration. The set of motion maps used to produce the image within the ROI box may be different than the set of motion maps used outside of the ROI box. Thus, synthetic focusing is performed differently within and outside of the ROI box in consideration of the diagnostic conditions encountered.

Synthetic focus motion data can also be subjected to post detection image processing such as XRES, an image processing technique available from Philips Ultrasound, which provides a more smoothly enhanced tissue texture in an ultrasound image.

Synthetic focus motion imaging may also benefit from wider aspect ratio and flat panel displays such as described in U.S. Pat. No. 6,516,215. Since synthetic focus motion imaging can produce simultaneous images in different display formats or motion characteristics from the same synthetic focus data set, displays such as these, with greater display areas, permit multiple synthetic focus images to be displayed at the same time for diagnoses based on multiple diagnostic parameters or the comparison of multiple images.

In summary, an embodiment of the present invention can provide one or more of the following advantages:

Good spatial resolution of echoes in all modes, with improvement due to dynamic transmit focusing;
High frame rates, even in colorflow mode;
Reduced spectral broadening;
High velocity resolution;
Improved (or reduced requirement for) wall filtering for colorflow imaging;
New display modes for flow;
Estimation of vector velocity with no angle correction, isotropic color displays;
Harmonic as well as fundamental imaging;
Speckle reduction;
Images with spatially variable processing; or
A unified system architecture with no partitioning for each mode.

What is claimed is:

1. A synthetic focus ultrasound system comprising:
an array of transducer elements comprising a plurality of sub-apertures;
a transmitter coupled to the transducer which acts to produce transmit events by the transmission from an individual element or group of elements over the full image field;
a receiver coupled to the transducer which receives echo signals from elements of the array in response to a transmit event or a focused transmit beam;
a processor coupled to the receiver which acts to synthetically focus different image data sets from different sub-apertures of the transducer array;
a combiner which acts to combine the synthetically focused image data from the different sub-apertures; and a display which displays images produced from the combined image data, wherein image speckle is reduced by spatial compounding.

2. The synthetic focus ultrasound system of claim 1, wherein the different sub-apertures view the image field of the transducer array from different look directions.

3. A synthetic focus ultrasound system for imaging an image field comprising:

an array of transducer elements;

a transmitter coupled to the transducer which acts to produce transmit events by the transmission from an individual element or group of elements over the full image field;

a receiver coupled to the transducer which receives echo signals from elements of the array in response to a transmit event;

a processor coupled to the receiver which performs synthetic focusing of a first type in a designated portion of the image field, and synthetic focusing of a second type in another portion of the image field; and a display which displays an image including the designated portion of the image field.

4. The synthetic focus ultrasound system of claim 3, wherein the designated portion of the image field comprises a region of interest delineated by a user.

5. The synthetic focus ultrasound system of claim 3, wherein the first type of synthetic focusing comprises a first type of motion processing, and wherein the second type of synthetic focusing comprises a second type of motion processing.

6. The synthetic focus ultrasound system of claim 5, wherein the first type of motion processing detects motion of a first velocity or velocity range and wherein the second type of motion processing detects motion of a second velocity or velocity range.

7. The synthetic focus ultrasound system of claim 3, wherein the first type of synthetic focusing comprises relatively high resolution focusing and wherein the second type of synthetic focusing comprises relatively low resolution focusing.

* * * * *